US007324956B2

(12) United States Patent
Kimura

(10) Patent No.: US 7,324,956 B2
(45) Date of Patent: Jan. 29, 2008

(54) ADVERTISEMENT SYSTEM AND RECORDING MEDIUM

(75) Inventor: Shuji Kimura, Kato (JP)

(73) Assignee: Fujitsu Limited, Kawasaki (JP)

( * ) Notice: Subject to any disclaimer, the term of this patent is extended or adjusted under 35 U.S.C. 154(b) by 53 days.

(21) Appl. No.: 10/101,871

(22) Filed: Mar. 21, 2002

(65) Prior Publication Data

US 2003/0115077 A1    Jun. 19, 2003

(30) Foreign Application Priority Data

Dec. 14, 2001  (JP)  ............................. 2001-381976

(51) Int. Cl.
*G06Q 30/00* (2006.01)
(52) U.S. Cl. .......................................... 705/14; 705/1
(58) Field of Classification Search ................. 709/14, 709/217, 203, 246; 379/93.08; 705/14, 705/1
See application file for complete search history.

(56) References Cited

U.S. PATENT DOCUMENTS

| 6,076,101 A * | 6/2000 | Kamakura et al. .......... 709/206 |
| 6,622,174 B1 * | 9/2003 | Ukita et al. ................. 709/246 |
| 2003/0004799 A1 * | 1/2003 | Kish ............................. 705/14 |

FOREIGN PATENT DOCUMENTS

| JP | 11-194787 | 7/1999 |
| JP | 2001-195321 | 7/2001 |
| JP | 2005084264 A * | 3/2005 |

OTHER PUBLICATIONS

JPO Notification of Reasons for Refusal dispatched Dec. 5, 2006 in corresponding Japanese Patent Application No. 2001-381976.

* cited by examiner

*Primary Examiner*—Pierre Eddy Elisca
(74) *Attorney, Agent, or Firm*—Staas & Halsey LLP

(57) ABSTRACT

An advertisement system is provided in which a facility can be advertised more efficiently than the conventional method. The advertisement system comprises an advertisement storage portion for storing advertisement data for promoting a use of the facility, a mail entry portion for entering a message and an electronic mail address to which an electronic mail is transmitted, so that a user of the facility can send the electronic mail, a mail preparation portion for preparing an electronic mail with an advertisement by reading the advertisement data out of the advertisement storage portion and by adding the advertisement data to the message, a mail transmission portion for transmitting the prepared electronic mail with an advertisement, an accounting information storage portion for storing the number of mails regarding the transmitted electronic mail for each user and an amount calculation portion for determining contents of a privilege in the facility that is given to the user on the basis of the number of mails with an advertisement that the user sent.

2 Claims, 16 Drawing Sheets

FIG.6A

%%%
%%% ALL STAFFS IN ** HOTEL ARE WAITING FOR YOUR ARRIVAL.
%%%
ROOM RATE : 5,000 YEN AND UP, BREAKFAST INCLUDED
DIRECT THROUGH  MOUNTAIN FROM  HOTEL.
ENJOY HOT SPRING AND HAVE FUN.

FOR MORE DETAIL http://www.abc-hotel.xx.jp

%%%
%%% ** HOTEL ACCEPT RESERVATIONS FOR CHRISTMAS DINNER.
%%%
PERIOD : DEC. 1ST THROUGH DEC. 5TH
EX-MASTER CHEF OF ** RESTAURANT IN FRANCE AND FIRST-RATE STAFFS ARE WAITING FOR YOUR COMING.
FOR MORE DETAIL http://www.abc-hotel.xx.jp

%%%
%%% SUMMER VACATION CAMPAIGN NOW UNDERWAY IN ** HOTEL
%%%
PERIOD : JUL. 21ST THROUGH AUG. 31ST
 HOTEL HAS HIGH CONVENIENCE FOR ACCESS TO SIGHTSEEING AREA SUCH AS  MOUNTAIN.
FOR MORE DETAIL http://www.abc-hotel.xx.jp

SENDER: mazda@kobe.abcdefg.com

TITLE: ARRIVED SAFELY.

BODY:
DEAR MS.YAMAMOTO
I ARRIVED AT A HOTEL SAFELY.
PALATABLE MEAL AND MAGNIFICENT NIGHT VIEW. LET'S STAY TOGETHER NEXT TIME.
%%%
%%% ALL STAFFS IN ** HOTEL ARE WAITING FOR YOUR ARRIVAL.
%%%
ROOM RATE : 5,000 YEN AND UP, BREAKFAST INCLUDED
DIRECT THROUGH  MOUNTAIN FROM  HOTEL.
ENJOY HOT SPRING AND HAVE FUN.

FOR MORE DETAIL http://www.abc-hotel.xx.jp

SEND    RESET

| ROOM NUMBER | CUSTOMER ID | CUSTOMER NAME | ROOM CHARGE | ROOM SERVICE | ... | MAIL WITH ADVERTISEMENT (COUNTER) | MAIL WITHOUT ADVERTISEMENT (COUNTER) |
|---|---|---|---|---|---|---|---|
| 1001 | U-2051 | AAA | ¥15,000 | ¥7,000 | ... | 10 | 1 |
| 1002 | U-3012 | BBB | ¥12,000 | ¥0 | ... | 5 | 0 |
| 1003 | U-2525 | CCC | ¥12,000 | ¥5,000 | ... | 8 | 5 |
| ... | ... | ... | ... | ... | | ... | ... |

FIG. 13

| | | |
|---|---|---|
| SENDER : | mazda@kobe.abcdefg.com | ~TB4a |
| DESTINATION : | leesuu@tokyo.abcdefg.com | ~TB4b |
| TITLE : | WHILE TRAVELING | ~TB4c |
| BODY : | DEAR MS.YAMAMOTO<br>THANK YOU FOR COMING OUR WEDDING.<br>WE HAVE JUST ARRIVED AT A HOTEL.<br>IT'S FRESH AIR HERE.<br>OUR PHOTOGRAPHS ARE UPLOADED TO MY<br>WEB PAGE.<br>PLEASE TAKE A LOOK. | ~TB4d |
| HOME PAGE URL : | homepage.kobe.abcdefg.com/~mazda | ~TB4e |
| FTP SERVER NAME : | ftp.kobe.absdefg.com | ~TB4f |
| FTP ACCOUNT NAME : | mazda | ~TB4g |
| FTP PASSWORD : | ***** | ~TB4h |
| DIRECTORY OF STORAGE TARGET : | homepage | ~TB4i |
| IMAGE SELECTION : | photo1.jpg  ~TB4j  REFER | |
| EXPLANATION : | SCENIC BEAUTY ** TEMPLE NEIGHBORING HOTEL | ~TB4k |

BN41~ [ SEND ]   [ RESET ]

HG4

HG5

ADVERTISEMENT SYSTEM AND RECORDING MEDIUM

BACKGROUND OF THE INVENTION

1. Field of the Invention

The present invention relates to an advertisement system for advertising a facility by using an electronic mail or an equivalent.

2. Description of the Prior Art

Conventionally, an adverting method for promoting a use of a facility is proposed, in which an advertisement of the facility is delivered to a user of the Internet as an electronic mail.

If a manager of the facility delivers the electronic mail by himself/herself, he/she has to collect a lot of electronic mail addresses. In order to collect the electronic mail addresses, there is a method in which a Web site of the facility is provided with a questionnaire page with a box for entering an electronic mail address.

There is another method in which a member's magazine (i.e., a mail magazine) issued regularly by an Internet service provider (ISP) for its subscribers contains an advertisement of the facility.

If the method of providing a questionnaire in a Web site is adopted, most of the collected electronic mail addresses are considered to be those of users who are interested in the facility. Therefore, these electronic mail addresses have high values for the facility.

However, since there are an unlimited number of Web sites on the Internet, considerable efforts should be made to increase the number of accesses to the Web site of the facility. For example, contents of the Web site should be expanded, or a banner advertisement should be displayed on a portal site of the ISP. In other words, it is actually difficult to collect electronic mail addresses efficiently in a short period of time only by providing a questionnaire in a Web site.

If the method in which a mail magazine contains an advertisement of the facility is adopted, the advertisement can be delivered to many users easily.

However, an advertisement fee should be paid to the ISP for the method. In addition, there is a possibility that the advertisement of the facility is overlooked due to being buried in articles of the mail magazine or other advertisements. Namely, it is not always an effective method since the advertisement is delivered to any user without considering whether he or she is interested in the facility or not.

SUMMARY OF THE INVENTION

An object of the present invention is to provide an advertisement system for advertising a facility more efficiently than the conventional method.

The advertisement system according to the present invention for advertising a facility comprises advertisement storage means for storing advertisement data for promoting a use of the facility, message input means for entering a message and an electronic mail address to which an electronic mail is transmitted, so that a user of the facility can send the electronic mail, mail preparation means for preparing an electronic mail with an advertisement by reading the advertisement data out of the advertisement storage means and by adding the advertisement data to the message, mail transmission means for transmitting the electronic mail with an advertisement prepared by the mail preparation means to the electronic mail address, storing means for storing the number of mails regarding the electronic mail with an advertisement transmitted by the mail transmission means for each user, and privilege calculation means for determining contents of a privilege in the facility that is given to the user on the basis of the number of the mails of the user.

Preferably, the storing means store accounting information for calculating a charge for using the facility for each user, and the privilege calculation means determine the privilege that is a discount on the charge to the user on the basis of the accounting information.

In another embodiment, the advertisement system further comprises address storage means for storing an electronic mail address to which the electronic mail with an advertisement is transmitted or an electronic mail address of the user who sent the electronic mail with an advertisement, and DM transmission means for transmitting an electronic mail that is a direct mail for promoting a use of the facility to an electronic mail address stored in the address storage means.

In still another embodiment, the advertisement system further comprises file acquisition means for acquiring a binary file by entering data of a voice or an image of the user, and first upload means for uploading the binary file acquired by the file acquisition means to a first server designated by the user for storing a file for a Web page, wherein the mail preparation means create the electronic mail with an advertisement by further adding a URL corresponding to the binary file uploaded by the first upload means and a notice that the binary file was uploaded to the message.

In still another embodiment, the advertisement system further comprises file acquisition means for acquiring a binary file by entering data of a voice or an image of a user of the facility, second upload means for uploading the binary file acquired by the file acquisition means to a second server for storing a file for a Web page advertising the facility, storing means for storing the number of files regarding the binary file for each user uploaded by the second upload means, the number of accesses from a terminal on a network to each binary file or evaluation information indicating an evaluation of contents of each binary file, and privilege calculation means for determining contents of a privilege in the facility that is given to the user on the basis of the number of files of the user, the number of accesses of the user to the binary file or the evaluation information of the binary file of the user.

In still another embodiment, the mail preparation means create the electronic mail with an advertisement by further adding a URL corresponding to the binary file uploaded by the second upload means to the message.

BRIEF DESCRIPTION OF THE DRAWINGS

FIGS. 6A-6C are diagrams showing examples of advertisement data.

FIG. 7 is a diagram showing an example of an incoming mail window.

FIG. 9 is a diagram showing an example of information about visitors memorized in an accounting information storage portion.

FIG. 13 is a diagram showing an example of a mail entry window.

DESCRIPTION OF THE PREFERRED EMBODIMENTS

Hereinafter, the present invention will be explained more in detail with reference to embodiments and drawings.

First Embodiment

Figure 1:
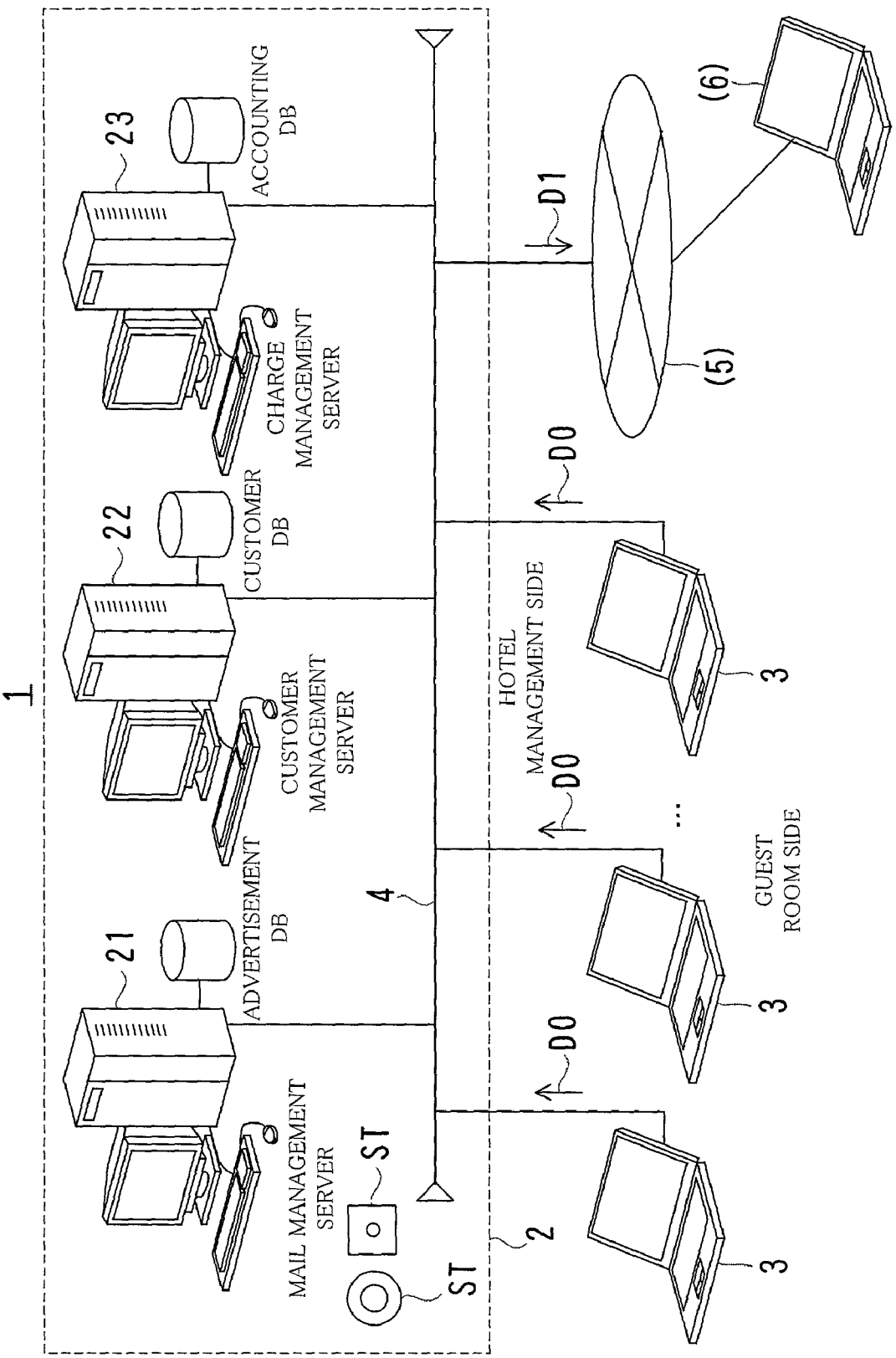
FIG. 1 is a diagram showing an example of an electronic mail transmission system according to the present invention.
Figure 2:
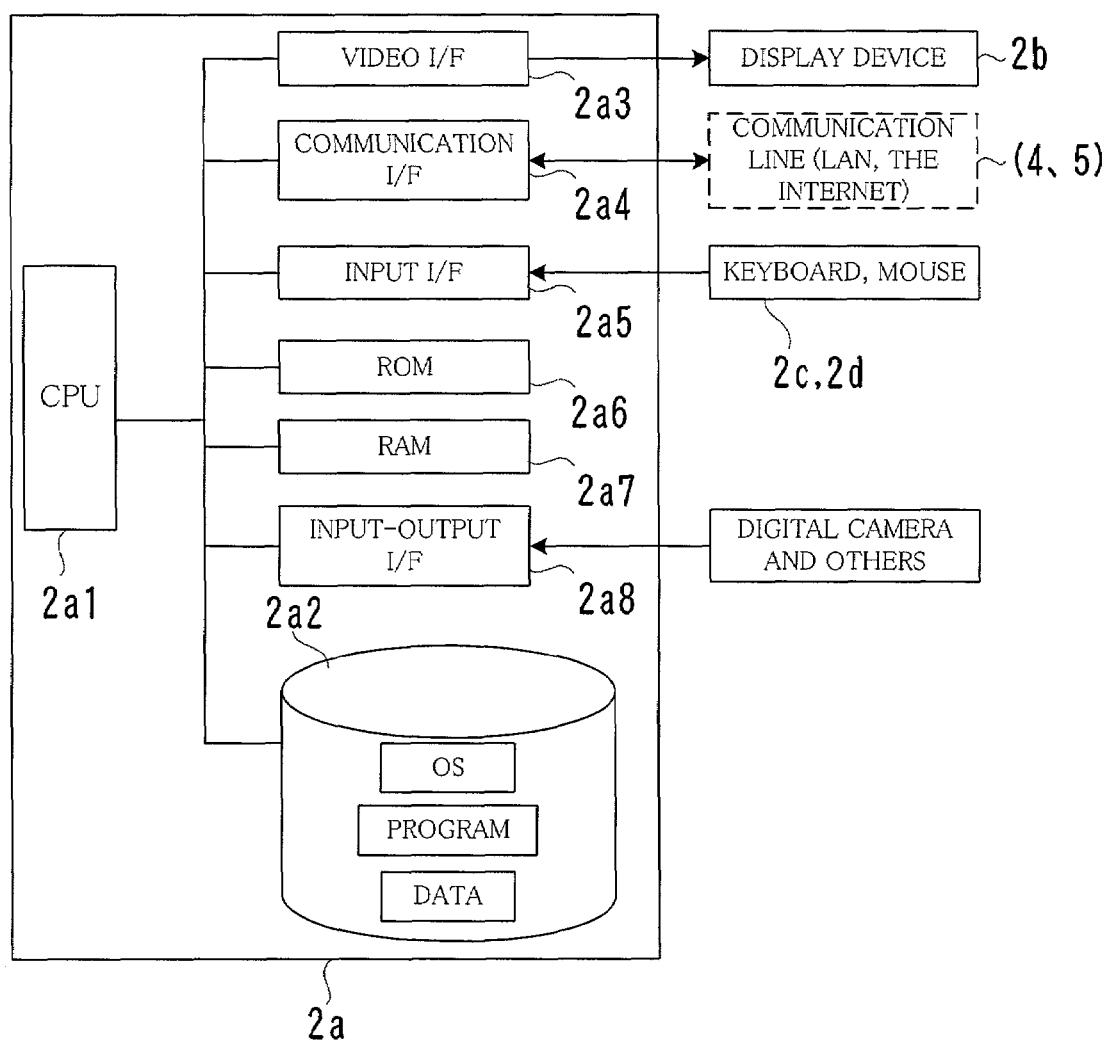
FIG. 2 is a block diagram showing an example of a mail management server and others.
Figure 3:
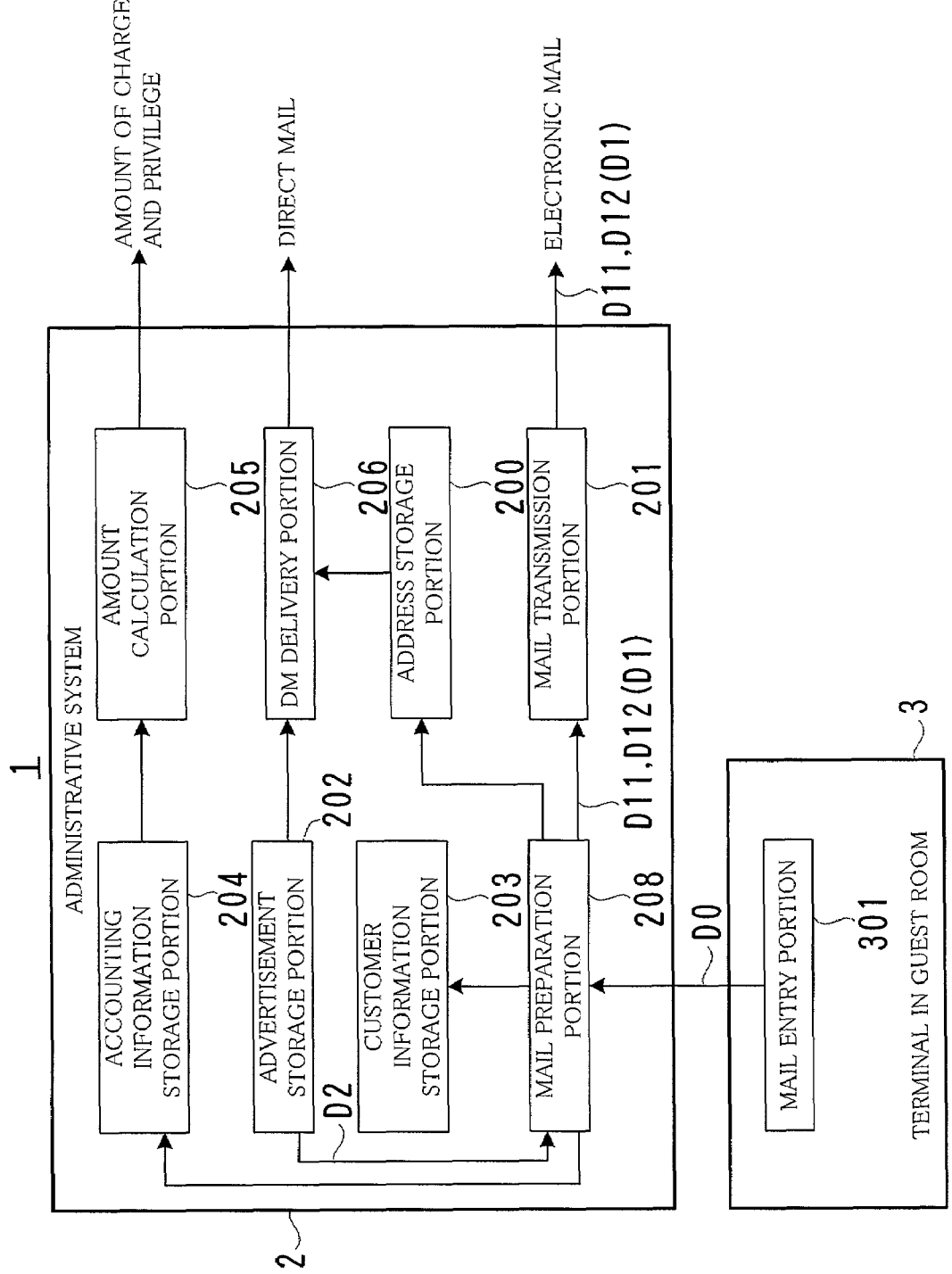
FIG. 3 is a block diagram showing an example of a functional structure of the electronic mail transmission system in the first embodiment.
Figure 4:
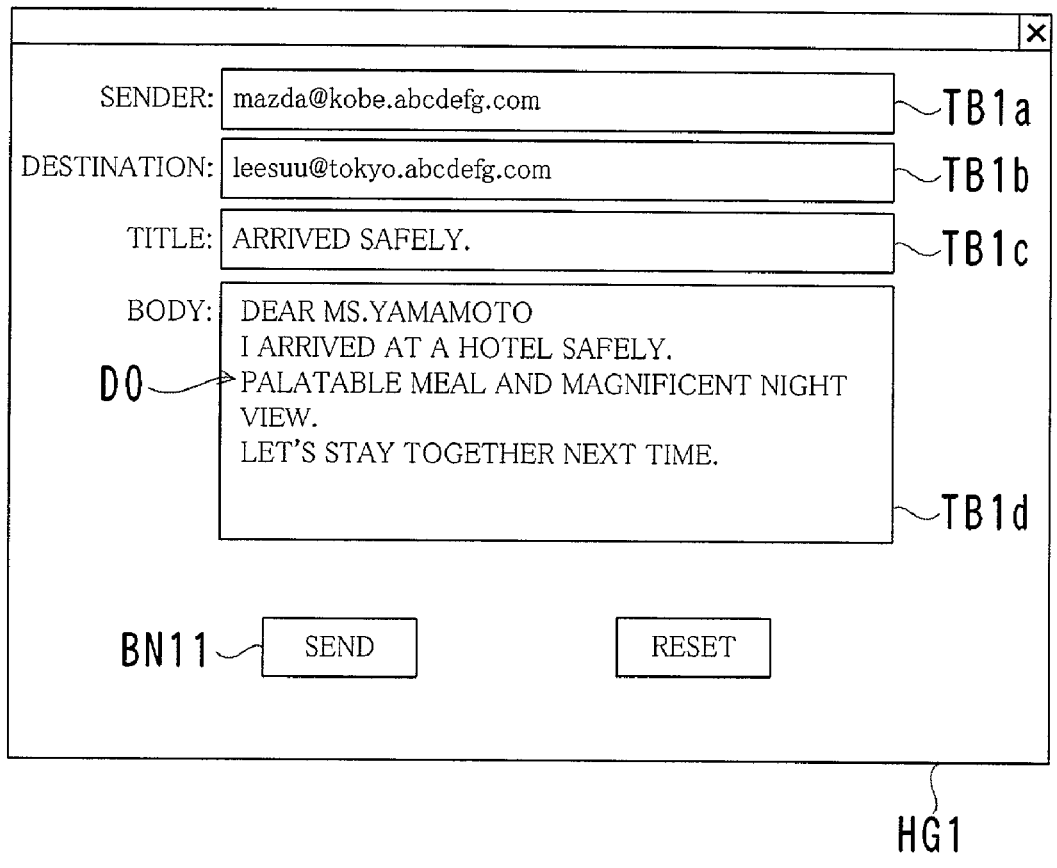
FIG. 4 is a diagram showing an example of a mail entry window.
Figure 5:
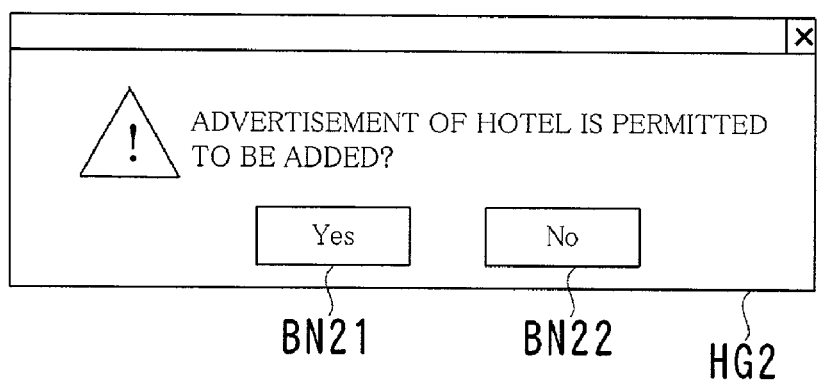
FIG. 5 is a diagram showing an example of a confirmation window.
Figure 8:
FIG. 8 is a diagram showing an example of a home page window.

FIG. 1 is a diagram showing an example of an electronic mail transmission system 1 according to the present invention. FIG. 2 is a block diagram showing an example of a mail management server 21 and others. FIG. 3 is a block diagram showing an example of a functional structure of the electronic mail transmission system 1 in the first embodiment. FIG. 4 is a diagram showing an example of a mail entry window HG1. FIG. 5 is a diagram showing an example of a confirmation window HG2. FIGS. 6A-6C are diagrams showing examples of advertisement data D2. FIG. 7 is a diagram showing an example of an incoming mail window HG3. FIG. 8 is a diagram showing an example of a home page window HG8. FIG. 9 is a diagram showing an example of information about visitors memorized in an accounting information storage portion 204.

The electronic mail transmission system 1 according to the present invention is installed in a facility such as a hotel and comprises a mail management server 21, a customer management server 22, a charge management server 23, terminals 3 and others as shown in FIG. 1. These devices are connected to each other via a communication line 4. In addition, since the communication line 4 is connected to the Internet 5, these devices can perform data transmission and reception of electronic mails or others with a computer outside the electronic mail transmission system 1 (e.g., a terminal 6).

The terminal 3 is installed one for each guest room in a hotel. Each terminal 3 corresponds to a room number of the guest room in which the terminal 3 is installed. For example, a table of relationship between an IP address of the terminal 3 and a room number is stored in the servers 21-23. The terminal 3 can be a personal computer, an Internet television or other various devices having an electronic mail function.

A visitor at the hotel can use the terminal 3 installed in the guest room for sending an electronic mail. Therefore, a visitor who does not have a notebook-size computer can send an urgent electronic mail. Furthermore, a visitor can send an electronic mail in the same way as sending a picture postcard when coming up with the idea of that while traveling.

The mail management server 21 performs a process concerning the electronic mail service, e.g., transmitting an electronic mail entered by the terminal 3 to a designated electronic mail address. The customer management server 22 performs management of information (a database) about visitors of the hotel. The charge management server 23 performs a charging (accounting) process of the hotel about a charge for a visitor's stay. In this embodiment, these processes are performed mainly by three servers. However, these processes can be performed by one server or shared by four or more servers depending on a size of the hotel and processing ability of the server. Hereinafter, the mail management server 21, the customer management server 22 and the charge management server 23 may be collectively called an "administrative system 2".

These servers 21-23 include a server unit $2a$, a display device $2b$, a keyboard $2c$ and a mouse $2d$ as shown in FIG. 2. The server unit $2a$ includes a CPU $2a1$, a magnetic storage device $2a2$, a video interface $2a3$, a communication interface $2a4$, an input interface $2a5$, a ROM $2a6$ and a RAM $2a7$. The servers 21-23 can be a UNIX (a registered trade mark) server, a workstation or a personal computer.

The magnetic storage device $2a2$ stores an operating system (OS) and various programs and data for realizing various functions that will be explained later. These programs are installed from a recording medium ST such as a CD-ROM, a MO or a DVD-ROM into the magnetic storage device $2a2$. These programs and data are loaded into the RAM $2a7$ and executed by the CPU $2a1$.

In this way, as shown in FIG. 3, the administrative system 2 realizes functions such as a mail transmission portion 201, an advertisement storage portion 202, a customer information storage portion 203, an accounting information storage portion 204, an amount calculation portion 205, a DM delivery portion 206, a mail preparation portion 208 and an address storage portion 200. In addition, the terminal 3 realizes functions such as a mail entry portion 301.

The mail entry portion 301 displays a mail entry window HG1 on the display device of the terminal 3 as shown in FIG. 4 and performs a process for entering a body of the electronic mail, i.e., a message DO to be transmitted. Text boxes TB1$a$-TB1$d$ of the mail entry window HG1 are used for entering a sender, i.e., an electronic mail address of the visitor, an electronic mail address to which the mail is transmitted, a title of the electronic mail and a mail body (a message D0 to be transmitted), respectively. For example, an electronic mail address of the visitor's friend or boss or a person who are in charge of the business is entered in the text box TB1$b$.

When a button BN11 in the mail entry window HG1 is clicked, the mail entry portion 301 transmits the contents in the text boxes TB1$a$-TB1$d$ to the administrative system 2. The mail entry window HG1 is prepared in each terminal 3. Otherwise, when the visitor (the user) starts entering a message, the terminal 3 accesses the mail management server 21 so as to download window information for displaying the mail entry window HG1.

The mail transmission portion 201 transmits the message D0 as an electronic mail D1 to the electronic mail address designated by the visitor. In this case, the mail preparation portion 208 performs a process for adding an advertisement of the hotel to the message D0 with permission of the visitor.

Namely, when receiving a message D0 from the terminal 3, the mail preparation portion 208 requests the visitor to answer whether he or she will permit that the advertisement of the hotel is added to the electronic mail to be transmitted or not. On this occasion, a confirmation window HG2 is displayed on the terminal 3 as shown in FIG. 5.

When a button BN21 in the confirmation window HG2 displayed on the terminal 3 is clicked, the mail preparation portion 208 knows the addition of the advertisement to the electronic mail was permitted. Then, the mail preparation portion 208 adds the advertisement of the hotel to the tail of the message D0. The data of the advertisement are stored as advertisement data D2 in the advertisement storage portion 202. The mail transmission portion 201 transmits the message D0 with the advertisement of the hotel as the electronic mail D1 to a designated address.

The advertisement data D2 that are text data are prepared for several patterns as shown in FIGS. 6A-6C. Among these patterns, one advertisement is selected in accordance with a term or a season and is added to the message D0. It is possible to prepare a plurality of advertisements for each term or season so as to select one advertisement at random among them. It is also possible to prepare advertisement data D2 including an image file (e.g., an animation GIF file) for a banner advertisement and a code of HTML (Hypertext Markup Language) for jumping to a Web site (a home page) of the hotel when the banner image is clicked. If the electronic mail D1 supports the HTML format, the image for the banner advertisement and the HTML code can be added to the tail of the message. The advertisement storage portion 202 also stores advertisement data for a direct mail that will be explained later.

On the other hand, if a button BN22 in the confirmation window HG2 displayed on the terminal 3 is clicked, the mail preparation portion 208 knows that the addition of the advertisement was not permitted. Therefore, the mail preparation portion 208 does not perform the process explained above. Then, an electronic mail D1 without an advertisement is transmitted to the designated address by the mail transmission portion 201. Hereinafter, the electronic mail D1 to which the advertisement is added is referred to as a "mail with advertisement D11", while the electronic mail D1 to which the advertisement is not added is referred to as a "mail without advertisement D12".

The incoming mail window HG3 as shown in FIG. 7 is displayed on the terminal 6 of a user who received a mail with advertisement D11 (see FIG. 1). When the URL (Uniform Resource Locator) of the advertisement in the incoming mail window HG3 is clicked, a WWW browser starts so as to display the home page window HG8 that is a top page of the Web site of the hotel as shown in FIG. 8.

As shown in FIG. 3, the customer information storage portion 203 stores information about customers who have used the hotel in addition to the current visitors. This information includes a customer ID unique to each of the customers, a name, an address, a telephone number, an electronic mail address, a history of stays, and a history of use of facilities in the hotel such as an electronic mail D1.

The address storage portion 200 stores electronic mail addresses of the customers of the hotel. For example, when the mail transmission portion 201 transmits an electronic mail D1, the electronic mail address of the destination and the electronic mail address of the visitor that is a sender are memorized additionally, so as to cumulate the electronic mail addresses. The cumulated electronic mail addresses are used for transmitting direct mails.

The accounting information storage portion 204 counts and memorizes the number of mails with advertisement D11 and the number of mails without advertisement D12 sent by the visitor during the stay in the hotel for each guest room as shown in FIG. 9. The accounting information storage portion 204 also stores information for charging such as a customer ID and a name of a visitor, a room charge and a charge of a room service in the guest room.

The amount calculation portion 205 calculates an amount to be charged to the visitor who checks out of the hotel. This amount of charge includes a room charge, a facility charge and a service charge. If no electronic mail D1 was transmitted from the terminal 3 in the guest room, the amount of charge is calculated in accordance with the room charge and the room service charge stored in the accounting information storage portion 204. If an electronic mail D1 was transmitted, the amount of charge is calculated as follows.

Among plural electronic mails D1, the mail without advertisement D12 is charged. For example, a predetermined amount (e.g. ¥10) may be charged on one mail without advertisement D12. In this case, concerning the visitor in the room (the room number is 1003) shown in FIG. 9, the amount of charge is calculated by adding ¥50 as a charge for use of the electronic mail.

The mail with advertisement D11 is free. In addition, the visitor who sent mails with advertisement D11 more than a predetermined number can be given a privilege such as a discount on the amount of charge as compensation for the advertisement of the hotel. For example, the visitor who sent two or more mails with advertisement D11 can be given a discount on the amount of charge by a predetermined amount (e.g. ¥10) for each mail with advertisement D11 after second mail. For example, the visitor in the room (the room number is 1003) can be given a discount of ¥70 corresponding to seven mails from the second through the eighth mails. Instead of giving a discount of a predetermined amount, another kind of privilege may be given such as a discount on the room charge at the rate of 0.1% for one transmission of the mail with advertisement D11, or a free drink of the room service if the visitor sent the mails with advertisement D11 more than a predetermined number.

If both the mail with advertisement D11 and the mail without advertisement D12 are transmitted from one guest room, the charge for the use of the mail without advertisement D12 is added to the room charge and the discount corresponding to the privilege for the mail with advertisement D11 is subtracted from the same so as to calculate the amount of charge to the visitor.

The DM delivery portion 206 delivers a direct mail to an electronic mail address of a customer stored in the address storage portion 200. For example, when an event or a campaign is held, a direct mail for announcement is delivered beforehand by an electronic mail.

Figure 10:
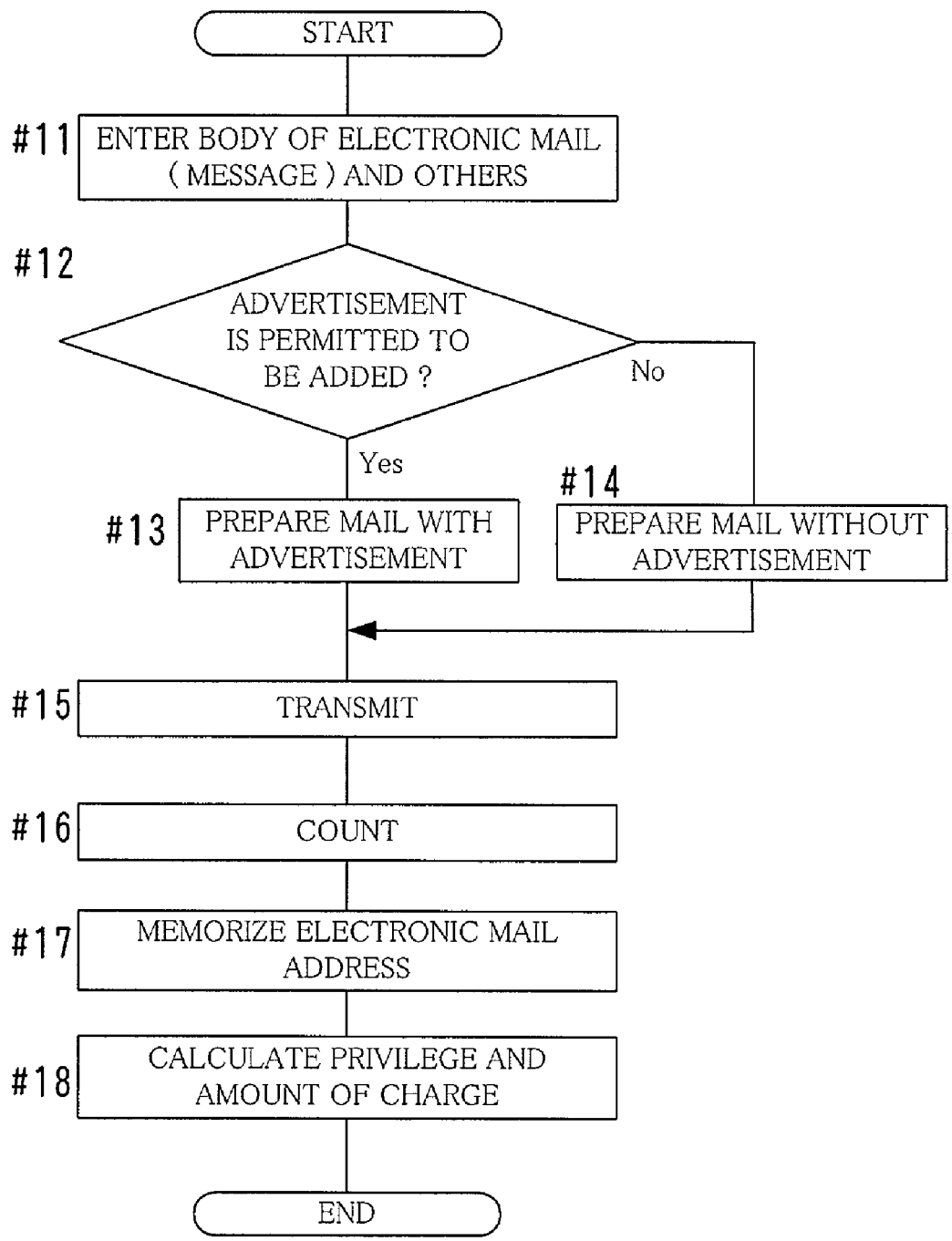
FIG. 10 is a flowchart for explaining a process of the electronic mail transmission system according to the first embodiment.

Next, a process of the electronic mail transmission system 1 until the visitor checks out will be explained with reference to a flowchart. FIG. 10 is a flowchart for explaining a process of the electronic mail transmission system 1 according to the first embodiment.

As shown in FIG. 10, when the visitor enters a body of the electronic mail (a message D0) and a destination address (#11), the visitor is requested to answer whether he or she will permit that the advertisement of the hotel is added to the electronic mail to be transmitted or not (#12).

If the answer permitting the addition of the advertisement is obtained (Yes in #12), the advertisement is added to the message D0 in accordance with the advertisement data D2 so as to prepare the mail with advertisement D11 (#13). If the answer not permitting the addition of the advertisement is obtained (No in #12), the mail without advertisement D12 is prepared (#14).

The generated mail with advertisement D11 or mail without advertisement D12 is transmitted to the designated address (#15), the number of transmitted mails with advertisement D11 or the number of transmitted mails without advertisement D12 is counted (#16). In addition, the electronic mail address of the sender and the electronic mail address of the destination (the receiver) are memorized (#17). These electronic mail addresses are used for transmitting a direct mail.

The process of Steps #11-#17 is repeated if necessary until the checkout. Then, when the visitor checks out, an amount of charge to the visitor is calculated in accordance with the number of the transmitted mails with advertisement D11 and mails without advertisement D12 (#18).

According to this embodiment, since the electronic mail entered by the visitor in the hotel is transmitted with the advertisement of the hotel, the advertisement of the hotel can be performed efficiently for the manager of the hotel. In addition, information of the electronic mail address of the visitor as well as information of the electronic mail address of his or her friends can be obtained. Such information can be used for obtaining a new customer by delivering a direct mail.

The advertisement that is added to the electronic mail is the advertisement of the hotel that the sender of the mail uses, who is an acquaintance of the receiver of the mail. Therefore, this advertisement can provide interest and reliability more than the conventional advertisement that is delivered at random.

Furthermore, a visitor can send an electronic mail without carrying a notebook computer or other equipment. In addition, the visitor can get a privilege such as a discount on the stay charge as compensation for advertising the hotel by sending an electronic mail.

In this embodiment, the privilege (the discount on the stay charge) for the mails with advertisement D11 that the visitor sent during the stay is used when the visitor checks out of the hotel. However, it is possible to use the privilege in another opportunity. For example, the number of mails concerning the transmitted mail with advertisement D11 may be cumulated as member's point, so that the visitor can get a discount in another stay in accordance with the cumulated points. Alternatively, it is possible to exchange the cumulated points with various free gifts.

Second Embodiment

Figure 11:
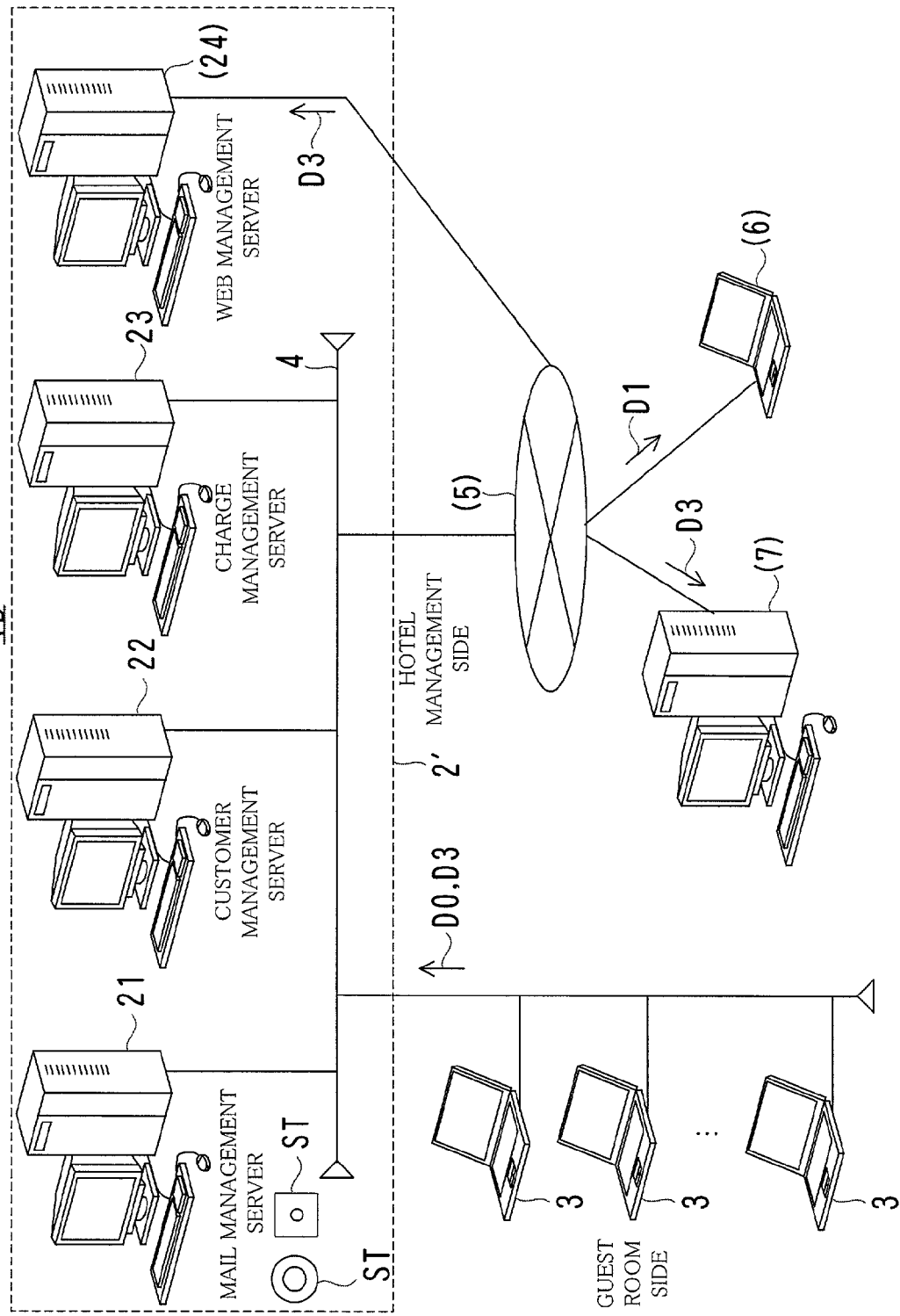
FIG. 11 is a diagram showing an example of an electronic mail transmission system according to the second embodiment.
Figure 12:
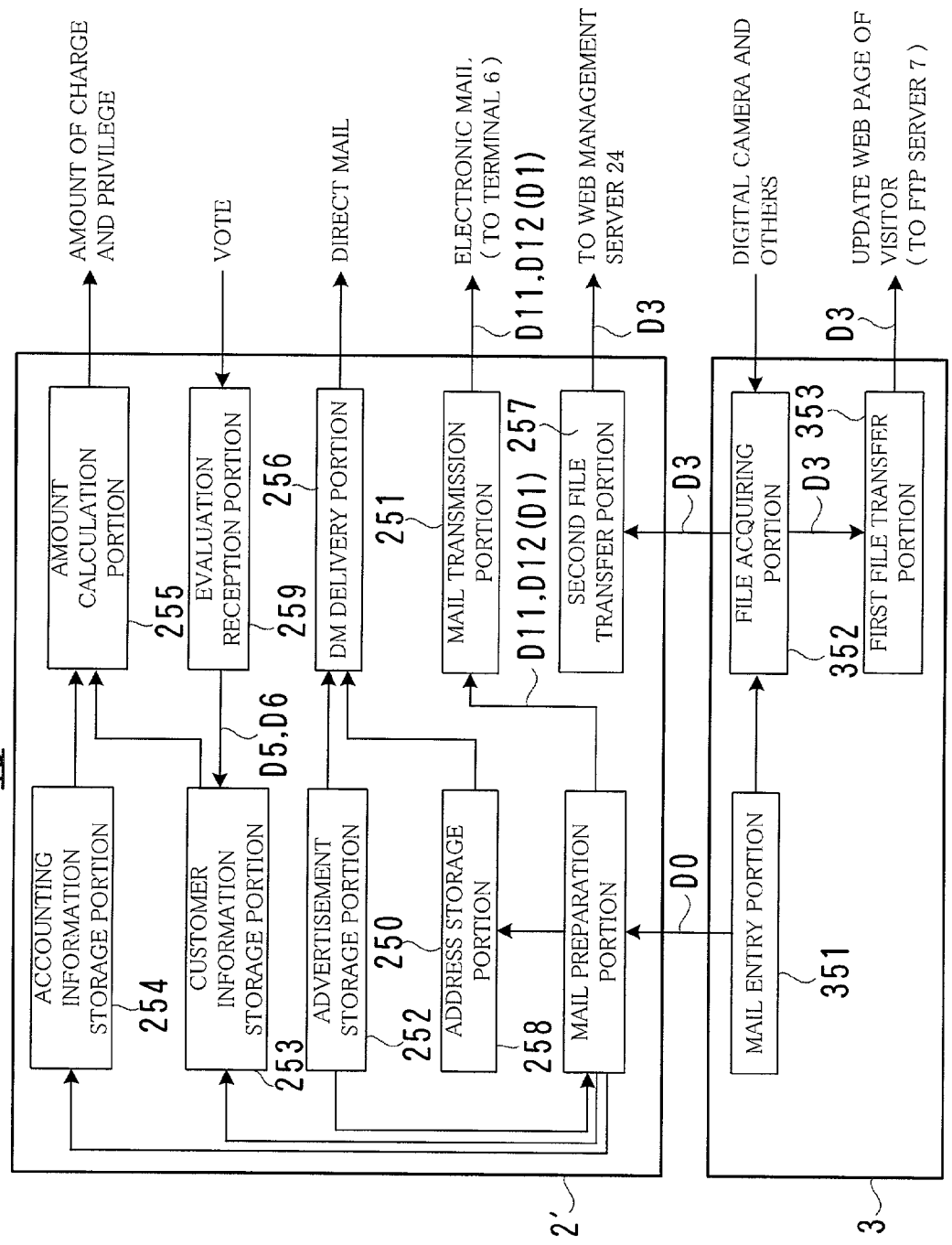
FIG. 12 is a diagram showing a functional structure of the electronic mail transmission system in the second embodiment.
Figure 14:
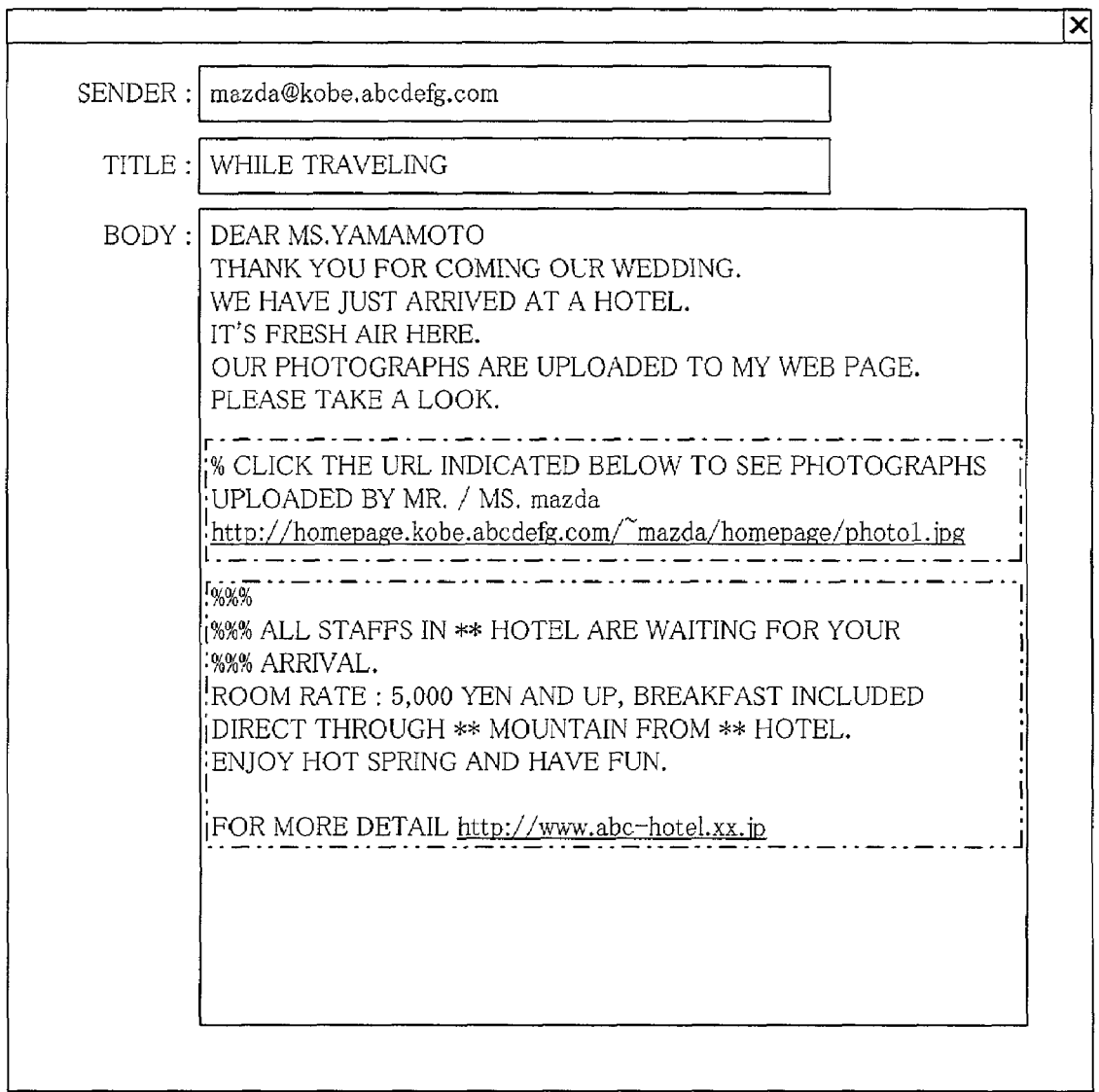
FIG. 14 is a diagram showing an example of an incoming mail window.
Figure 15:
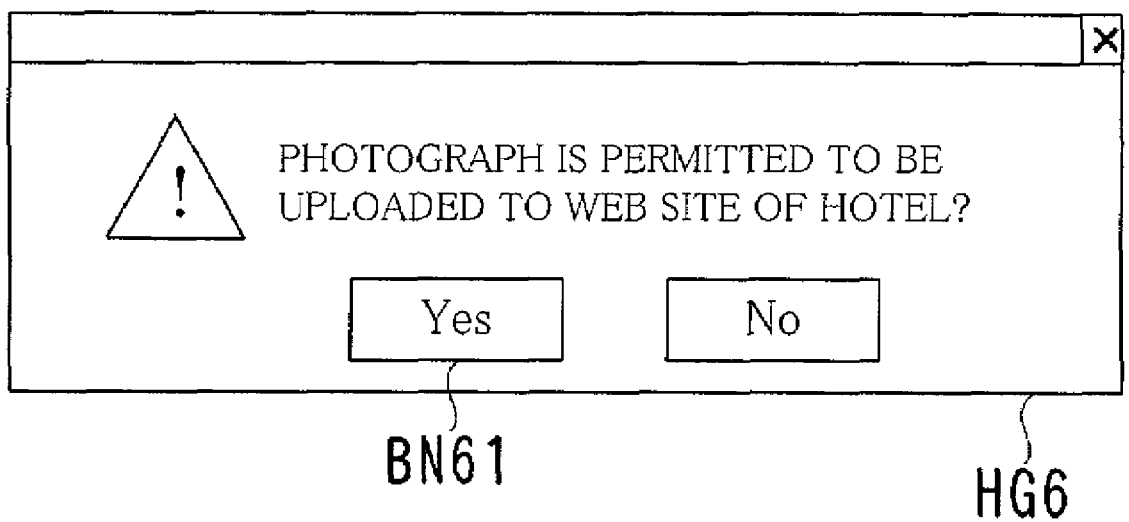
FIG. 15 is a diagram showing an example of a confirmation window.
Figure 16:
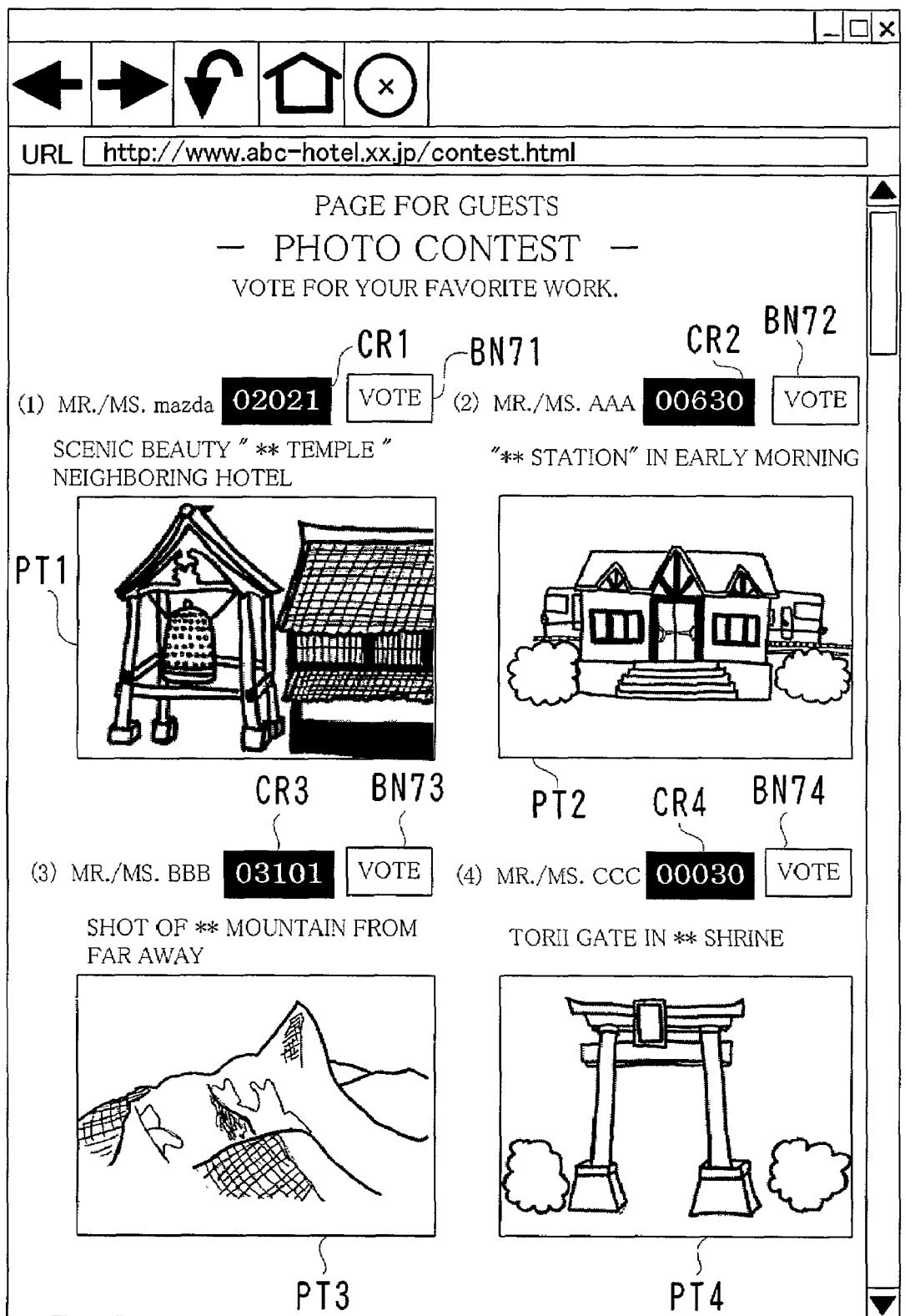
FIG. 16 is a diagram showing an example of a Web page window.

FIG. 11 is a diagram showing an example of an electronic mail transmission system 1B according to the second embodiment. FIG. 12 is a diagram showing a functional structure of the electronic mail transmission system 1B in the second embodiment. FIG. 13 is a diagram showing an example of a mail entry window HG4. FIG. 14 is a diagram showing an example of an incoming mail window HG5. FIG. 15 is a diagram showing an example of a confirmation window HG6. FIG. 16 is a diagram showing an example of a Web page window HG7.

In the first embodiment, a privilege such as a discount on the stay charge is given to the visitor who sent the electronic mail with the advertisement. In the second embodiment, another privilege is given to the visitor who helped the hotel reinforce the contents of the Web site of the hotel. For example, a privilege is given to a visitor who made an application for a photo contest held in the Web site of the hotel. Alternatively, the works in the photo contest are evaluated by normal Internet users so as to give another privilege to a visitor who applied the popular work.

As shown in FIG. 11, the structure of the electronic mail transmission system 1B according to the second embodiment is substantially the same as the electronic mail transmission system 1 of the first embodiment shown in FIG. 1. However, the electronic mail transmission system 1B is connected to a Web management server 24 for managing a Web site of a hotel via the Internet 5.

The Web management server 24 manages a Web page (also called a WWW page or a home page) for a Web site of a hotel. When receiving a designation of the URL from another terminal 6 that is connected to the Internet 5, the Web management server 24 transmits a file for displaying a Web page corresponding to the URL to the terminal 6. In this embodiment, the Web management server 24 is outside the electronic mail transmission system 1B. However, it can be inside the electronic mail transmission system 1B. Alternatively, the electronic mail transmission system 1B can be structured so that the servers 21-23 have the function similar to the Web management server 24.

The terminal 3 is used mainly for entering a body of the electronic mail, i.e., a message D0 in the first embodiment. However, in the present embodiment, the terminal 3 is used not only for entering a message D0 but also for uploading a file for the Web page of the visitor as well as for applying a work for a photo contest that is held by the hotel. Namely, using a terminal 3 in the guest room, a newly married couple staying at the hotel can send an electronic mail for reporting the recent state to friends, can upload photographs taken for memories of the travel to their Web page, or can apply the photographs for a photo contest, for example.

The terminal 3 can be connected to equipment such as a digital camera via an input-output interface 2a8 shown in FIG. 2. The input-output interface 2a8 can be USB (Universal Serial Bus), Bluetooth or IEEE1394, for example. A visitor can connect his or her digital camera to the terminal 3 for entering the photographed pictures as an image file D3 into the terminal 3. Alternatively, the image file D3 can be transferred into the terminal 3 via a recording medium such as a memory card.

According to this configuration, the administrative system 2' can realize a mail transmission portion 251, an advertisement storage portion 252, a customer information storage portion 253, an accounting information storage portion 254, an amount calculation portion 255, a DM delivery portion 256, a second file transfer portion 257, a mail preparation portion 258, an evaluation reception portion 259 and an address storage portion 250 as shown in FIG. 12. In addition, the terminal 3 realizes a mail entry portion 351, a file acquiring portion 352 and a first file transfer portion 353. Between FIGS. 3 and 12, elements having the same name, e.g., the mail transmission portions 201 and 251 perform the same process basically. The explanation of the same process as in the first embodiment may be omitted.

The file acquiring portion 352 of the terminal 3 acquires data of pictures entered from the digital camera of the visitor as the image file D3, which is stored with a file name.

The mail entry portion 351 displays a mail entry window HG4 on a display device of the terminal 3 as shown in FIG. 13 and performs a process for entering a file name of the image file D3 to be uploaded and a body of an electronic mail, i.e., a message D0 to be transmitted.

Matters similar to the text box TB1a-TB1d of the mail entry window HG1 shown in FIG. 4 are entered in the text box TB4a-TB4d of the mail entry window HG4. The URL of the Web page of the visitor is entered in the text box TB4a-TB4e, while a server name of an FTP server 7 (see FIG. 11) for managing a file of the Web page is entered in the text box TB4f. An FTP account name of the FTP server 7 of the visitor is entered in the text box TB4g, while a password is entered in the text box TB4h. A file name or a path of the image file D3 that is uploaded to the FTP server 7 or is applied for the photo contest is entered in the text box TB4j. A directory name of the storage target of the image file D3 designated by the text box TB4j in the FTP server 7 is entered in the text box TB4i. A brief explanation of the picture that is applied for the photo contest is entered in the text box TB4k.

When the button BN41 is clicked, the transmission of the electronic mail D1, the application for the photo contest and the upload of a file to the visitor's Web server are started as explained below.

As shown in FIG. 12, the first file transfer portion 353 uploads the image file D3 designated in the text box TB4j of the mail entry window HG4 to the FTP server 7 designated in the text box TB4f. Namely, the first file transfer portion 353 accesses the FTP server 7 and transmits an FTP account name and an FTP password designated in the text boxes TB4g and TB4h to the FTP server 7. When the FTP server 7 recognizes that the user authentication was performed with a correct user account, the image file D3 is transmitted to the directory designated in the text box TB4i. Thus, the Web page of the visitor is updated.

The mail preparation portion 258 of the administrative system 2' adds an advertisement to the message D0 so as to prepare the mail with advertisement D11 in the same way as the mail preparation portion 208 shown in FIG. 3. However, the mail preparation portion 258 adds (merges) not only the advertisement of the hotel but also an advice that the image file D3 is added to the Web page of the visitor in accordance with the contents of the text boxes TB4e, TB4i and TB4j in the mail entry window HG4. Then, the mail transmission portion 251 transmits the mail with advertisement D11 to the destination address designated by the visitor.

When a user receives this mail with advertisement D11 by a terminal 6, an incoming mail window HG5 is displayed on the terminal 6 as shown in FIG. 14. The portion enclosed by the alternate dot and dash line in the reception mail window HG5 is a guide to the Web page of the visitor, and the portion enclosed by the phantom line is the advertisement of the hotel. It is possible to add the advertisement of the hotel to the message D0 only when the sender permits in the same way as in the first embodiment. The number of the transmitted mails with advertisement D11 and the number of the transmitted mails without advertisement D12 are memorized in the accounting information storage portion 254.

The second file transfer portion 257 uploads a picture photographed by the visitor to the Web site of the hotel and performs the process for applying for the photo contest. Namely, the second file transfer portion 257 acquires the image file D3 designated in the text box TB4j of the mail entry window HG4 from the terminal 3 and transfers the image file D3 to the Web management server 24 together with a customer ID and a name of the visitor and an explanation of the picture entered in the text box TB4k. However, this process is performed when the visitor permits. Namely, the image file D3 is transferred when the button BN61 in the confirmation window HG6 is clicked after the confirmation window HG6 is displayed on the terminal 3 as shown in FIG. 15.

On this occasion, the Web management server 24 shown in FIG. 11 memorizes the image file D3 acquired from the second file transfer portion 257 in connection with the customer ID and updates the Web page for the photo contest so that the picture is added. Furthermore, a Web page window HG7 is displayed on the terminal 6 of an Internet user that accessed the Web page as shown in FIG. 16. This Web page is linked by the top page of the Web site of the hotel (see FIG. 8).

The images PT1-PT4 in the Web page window HG7 are thumbnail images of applied pictures of visitors. If the image PT is clicked, an enlarged picture of the image is displayed. On this occasion, the Web management server 24 transmits the Web page including the enlarged picture to the terminal 6 and transmits access information D5 indicating the customer ID corresponding to the clicked image PT to the electronic mail transmission system 1B. Counters CR1-CR4 indicate the numbers of clicks on the images PT1-PT4 performed by Internet users. Namely, the counters CR1-CR4 indicate the numbers of accesses to the works of visitors.

Buttons BN71 and BN72 are used for voting on the photo contest. The Internet user who appreciated the works of the photo contest may click one of buttons BN71, BN72, ... so as to vote for his or her favorite work. Then, the Web management server 24 informs the electronic mail transmission system 1B of vote information D6 that indicates the customer ID corresponding to the image PT of the clicked button. It is considered that the more the number of this vote is, the higher the evaluation of the work by Internet users is.

As shown in FIG. 12, when acquiring the access information D5 from the Web management server 24, the evaluation reception portion 259 increments the number of accesses of the customer ID indicated by the access information D5. In the same way, when acquiring the vote information D6, the evaluation reception portion 259 increments the number of evaluation points of the customer ID indicated by the vote information D6. The number of accesses to the work of the visitor and the number of votes (the evaluation points) are stored in the customer information storage portion 253. The customer information storage portion 253 also stores information about customers such as a customer ID and a customer name.

The amount calculation portion 255 calculates an amount of charge to a visitor who checks out in the same way as the amount calculation portion 205 shown in FIG. 3. However, the amount calculation portion 255 calculates the amount of charge in accordance with the number of the transmitted mails with advertisement D11, the number of the mails without advertisement D12, the number of pictures that were applied for the photo contest and the number of accesses and the number of votes stored in the customer information storage portion 253.

For example, a predetermined amount (e.g., ¥10) of discount may be given on the amount of charge for each application of a picture. A predetermined amount (e.g., ¥10) of discount may be given on the amount of charge for each thousand times of accesses to the work (the picture) of the visitor. Furthermore, a privilege such as a half-price of the stay charge may be given to the visitor of the work that obtained the largest number of votes. Some privileges may be given to the second-popular work and the third-popular work. If the result of the photo contest is not determined while the visitor stays, a privilege such as a discount on a stay charge may be given at the next opportunity to use the hotel.

The DM delivery portion 256 delivers a direct mail regarding an event of the hotel or others to the electronic mail address of the customer stored in the address storage portion 250, in the same way as the DM delivery portion 206 shown in FIG. 3. It is possible to deliver the result of the photo contest together with the direct mail.

Figure 17:
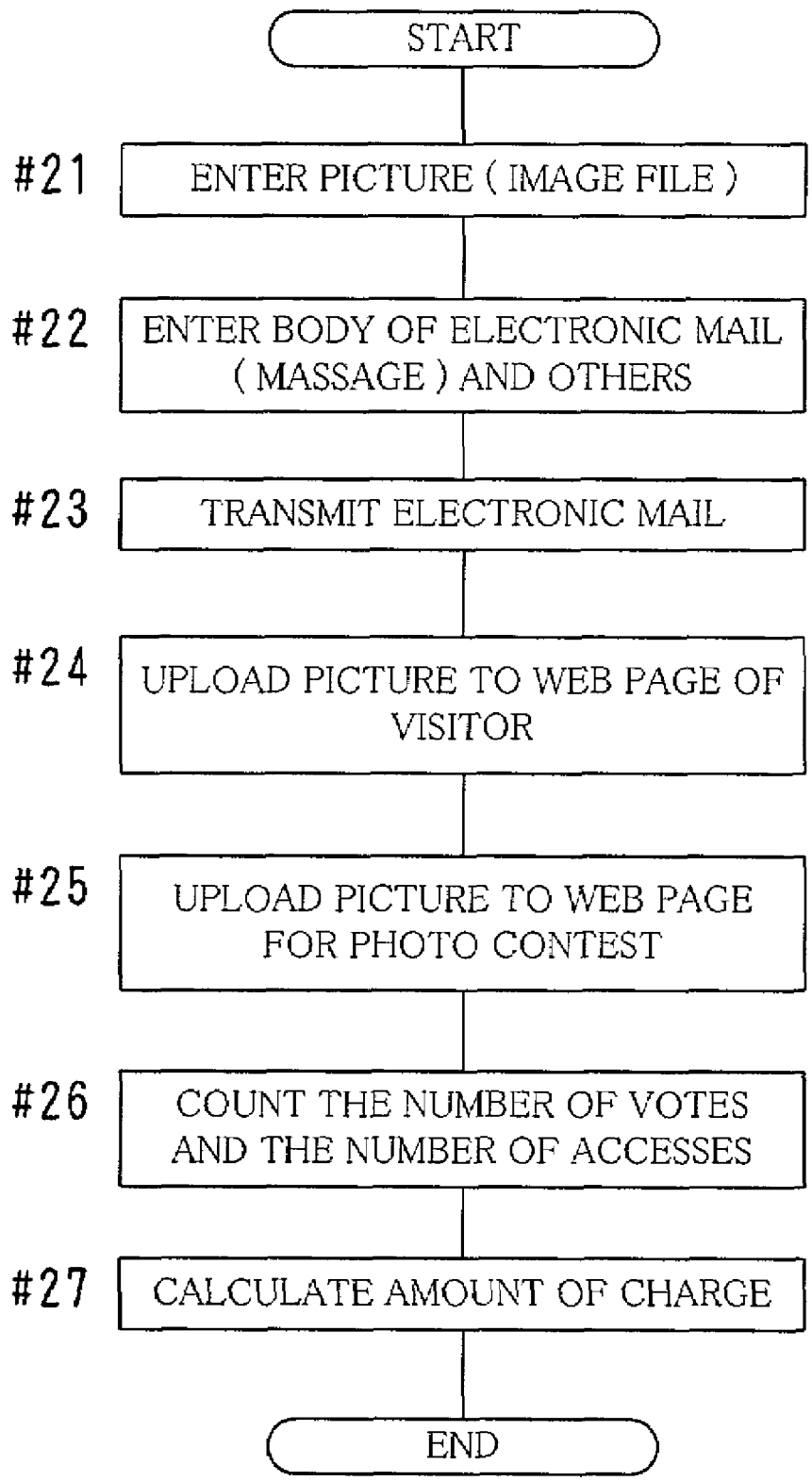
FIG. 17 is a flowchart for explaining the process of the electronic mail transmission system in the second embodiment.

Next, the process of the electronic mail transmission system 1B until the visitor checks out in the second embodiment will be explained with reference to a flowchart. FIG. 17 is a flowchart for explaining the process of the electronic mail transmission system 1B in the second embodiment.

As shown in FIG. 17, pictures photographed by the visitor are entered as an image file D3 from a digital camera of the visitor (#21). From the mail entry window HG4 shown in FIG. 13, a body of an electronic mail (a message), a path indicating the location where the image file D3 is stored or a file name and a server name of a FTP server 7 in which the Web page of the visitor is stored (#22).

In accordance with the items entered in the mail entry window HG4, the electronic mail D1 is transmitted (#23). At the same time or around this time, the image file D3 is uploaded (transferred) to the FTP server 7 in which the Web page of the visitor is stored and the Web management server 24 of the hotel (#24, #25). Thus, the picture photographed by the visitor is displayed in the Web page of the visitor and in the Web page of the hotel for the photo contest. The transmission process (#23) of the electronic mail D1 is basically performed in the same way as in the process of Steps #12-#17 shown in FIG. 10. However, in Step #13 and Step #14, information that the picture is uploaded to the Web page of the visitor is merged with the message.

The number of accesses to the picture applied for the photo contest and the number of evaluation points (the number of votes) are counted (#26). Then, when the visitor checks out, an amount of charge is calculated in accordance with the number of accesses to the picture of the visitor, the number of evaluation points, the number of uses of the mail with advertisement D11 and the number of uses of the mail without advertisement D12 (#27).

According to this embodiment, the Web site of the hotel can be expanded by using pictures photographed by visitors of the hotel. Thus, the number of Internet users who access the Web site increases, and the advertisement of the hotel can be achieved efficiently via a Web site.

The visitor can transmit a file for his or her Web page and can get a privilege such as a discount on a stay charge as compensation for providing contents to the Web site of the hotel.

In this embodiment, an image file of a still picture shot by a digital camera is uploaded to the Web management server 24 or the FTP server 7. However, it is possible to upload an image file of a moving picture shot by a digital video camera or a voice file recorded by a voice recorder.

In this embodiment, an advertisement of the hotel and a URL of the Web page of the visitor are added to the mail with advertisement D11 (see FIG. 14). However, it is possible to add a URL of the hotel for the photo contest or a URL of the visitor for his or her works.

The method of determining the privilege that is given to the visitor is not limited to that explained above. For example, it is possible to give a privilege to the visitor who applied the largest number of works when visitors compete the number of pictures that is applied for the photo contest (the number of files regarding the image file D3 that is uploaded to the Web management server 24). It is possible to give a privilege to an applicant who applied the work that has gotten the largest number of accesses. The method for evaluating works is not limited to votes by Internet users. For example, it is possible that Internet users who appreciated works on the photo contest put scores on the works. Then, a visitor who got the highest point can be given a privilege, or visitors who got points above a predetermined point can be given a privilege.

The electronic mail transmission systems 1 and 1B can be also applied to facilities except a hotel. For example, the electronic mail transmission system 1B can be installed in a play facility such as a bowling alley. Then, using a video camera of a player or a video camera that is provided to the bowling alley, a picture can be taken during the play and uploaded to the Web site of the bowling alley.

Furthermore, the electronic mail transmission system 1B can be installed in a karaoke room. Then, a singing voice of a customer can be recorded and uploaded to a karaoke contest that is held on the Web site of the karaoke room.

A structure, a process, an order in the process of a whole or a part of the electronic mail transmission systems 1 and 1B, the mail management server 21, the customer management server 22, the charge management server 23, the Web management server 24 or the terminal 3 can be modified within the scope of the present invention, if necessary.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An advertisement system for advertising a facility, comprising:

advertisement storage means for storing advertisement data promoting use of the facility;

message input means for entering a message and a related electronic mail address to which an electronic mail including the message is transmitted, so that a user of the facility can send the electronic mail;

mail preparation means for adding the advertisement data promoting use of the facility to the message that is entered by the message input means to prepare the electronic mail with an advertisement;

mail transmission means for transmitting the electronic mail with an the advertisement to the related electronic mail address;

storing means for storing the number of mails regarding the electronic mail with the advertisement transmitted by the mail transmission means for each user who physically uses the facility;

privilege calculation means for determining contents of a privilege in the facility that is given to the user on the basis of the number of the mails of the user;

file acquisition means for acquiring a binary file by entering data of a voice or an image of the user; and first upload means for uploading the binary file acquired by the file acquisition means to a first server designated by the user for storing a file for a Web page, wherein the mail preparation means create the electronic mail with the advertisement by further adding a URL corresponding to the binary file uploaded by the first upload means and a notice that the binary file was uploaded to the message.

2. A computer-readable recording medium storing a computer program that is executed by a computer to perform a method for advertising a facility, the method comprising:

entering a message and a related electronic mail address to which an electronic mail including the message is transmitted, so that a user of the facility can send the electronic mail;

adding advertisement data for promoting a use of the facility to the message that is entered to prepare the electronic mail with an advertisement;

transmitting the electronic mail with the advertisement to the related electronic mail address;

counting the number of mails, regarding the transmitted electronic mail with the advertisement, for the user;

determining contents of a privilege in the facility that is given to the user on the basis of the number of mails of the user;

acquiring a binary file by entering data of a voice or an image of the user; and uploading the acquired binary file to a server designated by the user for storing a file for a Web page; and preparing the electronic mail with the advertisement by further adding a URL corresponding to the binary file uploaded and a notice that the binary file was uploaded to the message.

* * * * *

UNITED STATES PATENT AND TRADEMARK OFFICE
CERTIFICATE OF CORRECTION

| | | |
|---|---|---|
| PATENT NO. | : 7,324,956 B2 | Page 1 of 1 |
| APPLICATION NO. | : 10/101871 | |
| DATED | : January 29, 2008 | |
| INVENTOR(S) | : Shuji Kimura | |

It is certified that error appears in the above-identified patent and that said Letters Patent is hereby corrected as shown below:

On the title page item [56]:

Column 2 (Other Publications), Line 2, change "Japenese" to --Japanese--.

Column 12, Line 48, after "with" delete "an".

Signed and Sealed this

Eighth Day of July, 2008

JON W. DUDAS
*Director of the United States Patent and Trademark Office*